UNITED STATES PATENT OFFICE.

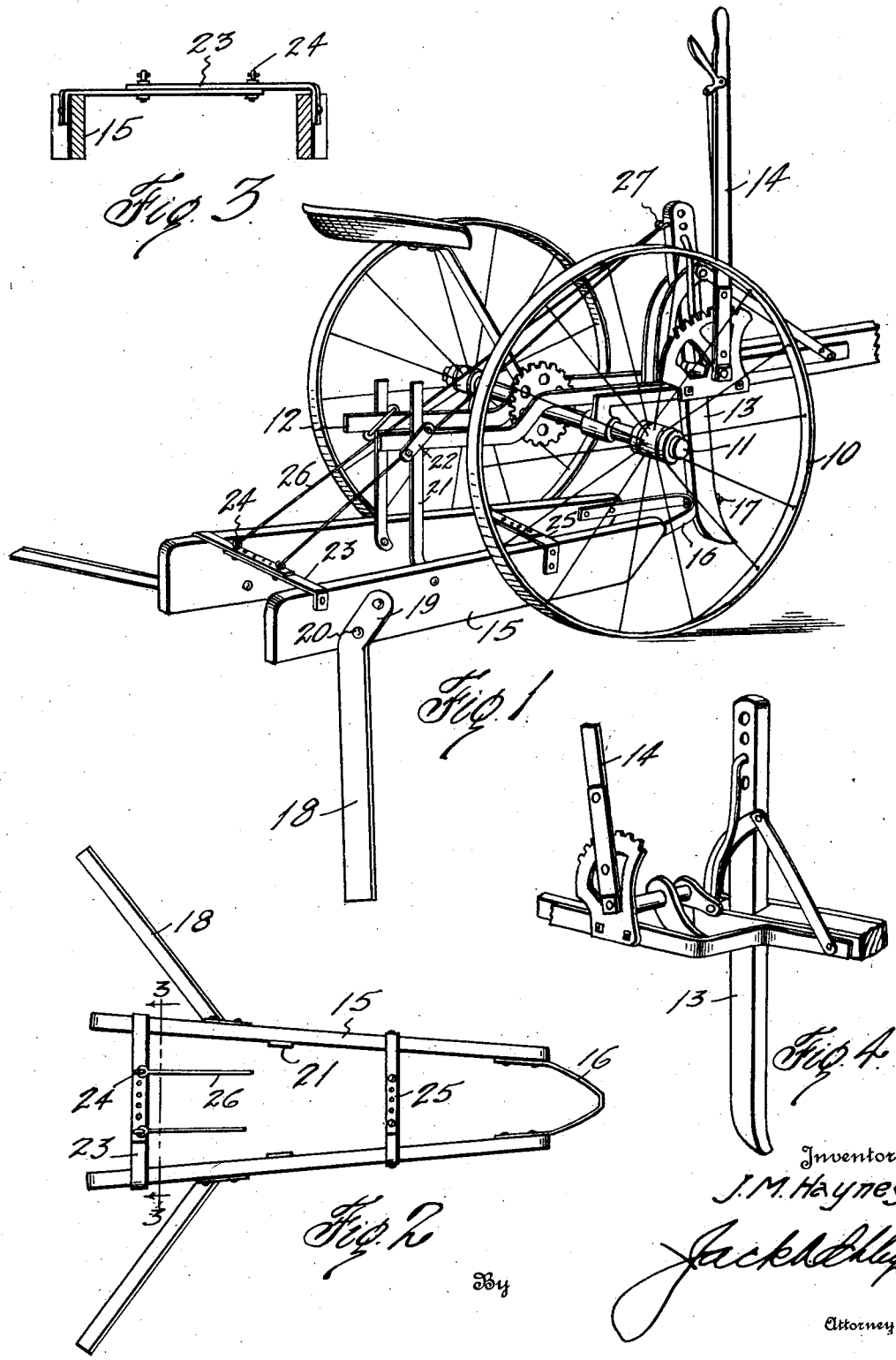

JACK M. HAYNES, OF FROST, TEXAS.

STALK-CUTTER ATTACHMENT.

1,405,782.  Specification of Letters Patent.  Patented Feb. 7, 1922.

Application filed May 2, 1921. Serial No. 466,159.

*To all whom it may concern:*

Be it known that I, JACK M. HAYNES, a citizen of the United States, residing at Frost, in the county of Navarro and State of Texas, have invented certain new and useful Improvements in Stalk-Cutter Attachments, of which the following is a specification.

This invention relates to new and useful improvements in stalk cutter attachments.

The object of the invention is to provide a stalk cutter which may be readily attached to a planter, whereby the planter may be made to serve a double purpose. A further object is to provide an attachment which may be connected with the planter mechanism in such a manner as to be raised and lowered by the usual adjusting means which is built into the planter.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a perspective view of a planter equipped with a stalk cutter attachment constructed in accordance with my invention, Fig. 2 is a plan view of the attachment, Fig. 3 is a cross sectional detail view on the line 3—3 of Fig. 2, and Fig. 4 is a perspective view of a portion of the elevating means of the planter.

In the drawings the numeral 10 designates the ground wheels of a planter, 11 the axle, 12 the beams and 13 the adjustable standard. The beams 12 and the standard are usually arranged to be elevated by a lever 14. The structure which has been illustrated in the drawings is typical and it is to be understood that the attachment may be mounted on any manufacture of planter.

The seed can and dropping mechanism have been omitted and these parts can be removed from the planter, together with the covering shovels and the bottom. The planter being stripped of unnecessary parts is reduced in weight and functions as a supporting frame.

The attachment comprises a pair of upright runners or side members 15 connected at their forward end by a yoke 16 which is fastened to the rear side of the standard by means of a heel bolt 17. The runners are spaced apart and each is provided with an outwardly and rearwardly extending cutting blade 18 having an upwardly bent ear 19 which is fastened to the runners by bolts 20. Hanger bars 21 extend upwardly from the runners and are fastened to the beams 12 by U-shaped clamp brackets 22. The rear ends of the runners are connected by overlapping bars 23, having their overlapping portions penetrated by eye bolts 24. The connecting bars are provided with perforations for receiving the bolts 24, whereby the runners may be spaced apart or drawn together as is desired. A second set of transverse connecting bars 25 are arranged near the forward ends of the runners so as to properly hold them in their spaced relations.

Rods or other connections 26 extend from the eye bolts 24 to an eye bolt 27 fastened at the top of the standard 13. It is to be understood that when the lever 14 is swung to elevate the standard 13 and the beams 12, the attachment will be raised by means of the hangers 21 and its attachment to the standard. As the majority of the weight is at the rear end of the attachment the rods 26 are employed as a brace and whereby a portion of the load will be sustained by the upper end of the standard. The cutters 18, of course, will project laterally and cover a substantial area. It is to be understood that cutters of different length may be substituted and the runners may be spaced as desired.

Various changes in the size and construction of the parts as well as modifications may be made without departing from the spirit of the invention.

What I claim is:

1. In a stalk cutter attachment for a wheeled frame, a pair of spaced runners, a yoke at the front end of the runners for attachment to a standard of the frame, hanger bars extending upwardly from the runners, means for attaching the hanger bars to the beams of the frame, an auxiliary support extending from the rear portion of the runners and adapted to be attached to the upper end of a standard, and diverging cutter blades carried at the rear ends of the runners.

2. In a stalk cutter attachment for a wheeled frame, a pair of elongated runners, a yoke connected at the front end of the runners, overlapping connecting bars extending between the rear ends of the runners, eye bolts fastening the bars together, sustaining elements extending from the eye bolts and adapted to be attached to the upper end of a planter standard, and cutter blades having angularly disposed ears attached to the sides of the runners.

In testimony whereof I affix my signature.

JACK M. HAYNES.